US011149146B2

United States Patent
Kim et al.

(10) Patent No.: US 11,149,146 B2
(45) Date of Patent: Oct. 19, 2021

(54) IRREVERSIBLE THERMOCHROMIC MOLDED ARTICLE FOR PREVENTION OF OVERHEATING AND METHOD FOR PREPARING SAME

(71) Applicant: ACTIVON CO., LTD., Suwon-si (KR)

(72) Inventors: Ji Soo Kim, Yongin-si (KR); Youn Ki Cho, Yongin-si (KR)

(73) Assignee: ACTIVON CO., LTD.

( * ) Notice: Subject to any disclaimer, the term of this patent is extended or adjusted under 35 U.S.C. 154(b) by 114 days.

(21) Appl. No.: 16/615,732

(22) PCT Filed: May 18, 2018

(86) PCT No.: PCT/KR2018/005701
§ 371 (c)(1),
(2) Date: Nov. 21, 2019

(87) PCT Pub. No.: WO2018/216964
PCT Pub. Date: Nov. 29, 2018

(65) Prior Publication Data
US 2020/0216675 A1    Jul. 9, 2020

(30) Foreign Application Priority Data

May 25, 2017   (KR) .................. 10-2017-0064883
May 16, 2018   (KR) .................. 10-2018-0056174

(51) Int. Cl.
*C09B 67/02*   (2006.01)
*B29C 48/00*   (2019.01)
(Continued)

(52) U.S. Cl.
CPC ...... *C09B 67/0097* (2013.01); *B29C 45/0001* (2013.01); *B29C 48/022* (2019.02);
(Continued)

(58) Field of Classification Search
None
See application file for complete search history.

(56) References Cited

U.S. PATENT DOCUMENTS 7,662,466 B2   2/2010   Seeboth et al.
8,664,156 B2 *  3/2014   Kwan .................. B41M 5/337
                                                           503/201
(Continued)

FOREIGN PATENT DOCUMENTS

CN           1835997 A      9/2006
CN         101913802 A     12/2010
(Continued)

OTHER PUBLICATIONS

JP-2006012470-A, Jan. 2006, Machine translation (Year: 2006).*
JP-2000118581-A, Apr. 2000, Machine Translation (Year: 2000).*
JP-2007332232-A, Dec. 2007, Machine translation (Year: 2007).*

*Primary Examiner* — Satya B Sastri
(74) *Attorney, Agent, or Firm* — Nguyen Tarbet LLC

(57) ABSTRACT

Provided are an irreversibly discoloring pigment for preventing overheating, a thermochromic molded article including the same, and a method of preparing the same, and more particularly, a discoloring pigment which becomes discolored when overheated, and then maintains the discoloration even after being cooled to room temperature, a thermochromic molded article including the discoloring pigment, and methods of preparing the discoloring pigment and the thermochromic molded article.

2 Claims, 2 Drawing Sheets

(51) Int. Cl.
  *B29C 45/00*  (2006.01)
  *C08K 5/00*  (2006.01)
  *C08K 9/10*  (2006.01)
  *C09B 67/08*  (2006.01)
  *C09B 67/42*  (2006.01)
  *H01R 4/22*  (2006.01)
  *B29K 105/00*  (2006.01)
  *B29L 31/34*  (2006.01)

(52) U.S. Cl.
  CPC ............. *C08K 5/0041* (2013.01); *C08K 9/10* (2013.01); *C09B 67/0013* (2013.01); *C09B 67/0071* (2013.01); *H01R 4/22* (2013.01); B29K 2105/0032 (2013.01); B29L 2031/3406 (2013.01)

(56) References Cited

U.S. PATENT DOCUMENTS

| | | | |
|---|---|---|---|
| 9,224,565 B2 * | 12/2015 | Moon | H01H 69/02 |
| 9,682,594 B2 | 6/2017 | Ono | |
| 9,695,329 B2 | 7/2017 | Ono | |
| 10,190,631 B2 * | 1/2019 | Gorges | G01K 11/12 |
| 2018/0244944 A1 * | 8/2018 | Shivkumar | C09D 5/26 |

FOREIGN PATENT DOCUMENTS

| | | | |
|---|---|---|---|
| CN | 102069525 A | | 5/2011 |
| CN | 102423673 A | | 4/2012 |
| CN | 102634126 A | | 8/2012 |
| CN | 102807853 A | | 12/2012 |
| CN | 105308150 A | | 2/2016 |
| EP | 3042942 B1 | | 5/2018 |
| JP | S63123438 A | | 5/1988 |
| JP | H06111863 A | | 4/1994 |
| JP | 10-329421 A | | 12/1998 |
| JP | 2000-118581 A | | 4/2000 |
| JP | 2000118581 A | * | 4/2000 |
| JP | 2003313453 A | | 11/2003 |
| JP | 2006-012470 A | | 1/2006 |
| JP | 2006012470 A | * | 1/2006 |
| JP | 2007332232 A | * | 12/2007 |
| JP | 2009126999 A | | 6/2009 |
| JP | 2010126549 A | | 6/2010 |
| JP | 2012188648 A | | 10/2012 |
| JP | 2014015546 A | | 1/2014 |
| JP | 2015-083641 A | | 4/2015 |
| KR | 10-2011-0042777 A | | 4/2011 |
| KR | 10-2015-0138770 A | | 12/2015 |

* cited by examiner

IRREVERSIBLE THERMOCHROMIC MOLDED ARTICLE FOR PREVENTION OF OVERHEATING AND METHOD FOR PREPARING SAME

TECHNICAL FIELD

The present disclosure relates to an irreversibly discoloring pigment for preventing overheating, a thermochromic molded article including the same, and a method of preparing the same. More particularly, the present disclosure relates to a discoloring pigment that becomes discolored when overheated and then maintains the discoloration even after being cooled to room temperature, a thermochromic molded article including the discoloring pigment, and methods of preparing the discoloring pigment and the thermochromic molded article.

BACKGROUND ART

Solderless terminal lugs for wiring are used for crimping the end of an insulated wire which is uncovered at an appropriate length to effectively join and connect a component with another component, a component and power, and a wire with another wire in electrical appliances. Generally, such a solderless terminal lug may be safely used after being coupled to an insulated protective cap.

However, due to characteristics of electrical appliances, overheating may occur at connection portions of wires, which causes a risk of fire, and thus the insulated protective cap may often be manufactured to enable detection of overheating at the connection portions of wires.

This overheating-detecting insulated protective cap includes a reversible discoloring pigment that reversibly discolors with temperature changes, and thus allows overheating to be detected through color changes that occur with overheating. Existing overheating-detecting insulated protective caps have reversible characteristics in that they become discolored (decolored) when overheated to a temperature of 70° C. or higher and restore their original colors when cooled to 60° C. Although these overheating-detecting insulated protective caps become discolored when overheated, because they contain a reversible discoloring pigment, they restore their original colors when heat is released by cutting off electricity and they are cooled to room temperature. When overheating occurs at the connection portion of wires for any reason, it is necessary to find the overheated portion after cutting off electricity, and to replace and repair the overheated portion. However, since the discoloring pigment returns to its original color at 60° C., there is a problem in that it is difficult to detect which connection portion is overheated, when heat is released by cutting off electricity and it is cooled to room temperature.

Patent Document 1 relates to "a solderless terminal lug for wiring, which may be inspected for cable connection". The original purpose of the corresponding patent is to prevent a poor connection between a solderless terminal lug for wiring and a cable. The solderless terminal lug for wiring is composed of a soft synthetic resin material as an inspection member for inspecting the cable connection. A reversible discoloring pigment is applied to this resin to visually inspect heating of the cable. As a result, although it is possible to inspect overheating through the color change in the inspection member, the member is only for inspecting whether or not the cable is connected. Therefore, since the member is discolored even in the normal connection that may not be regarded as overheating, it is practically impossible to selectively inspect only the overheating. Furthermore, since the reversible discoloring pigment is applied to the inspection member, there is a problem in that it is impossible to inspect whether or not the overheating of the connection portion occurs when cooled to room temperature after the overheating is released.

Patent Document 2 relates to an insulated protective cap of a color-variable solderless terminal lug for wiring, and a manufacturing method thereof, in which an operator is able to easily detect the phenomenon of heat generation through color change in the case of poor connection between the solderless terminal lug for wiring and a cable. For the color change, a reversible discoloring pigment was applied to a first variable part and an irreversible discoloration ink was applied to a second variable part. However, since the color of the reversible discoloring pigment is restored when the power supply is cut off, it is difficult to identify where overheating has occurred. To inspect the device inside which the overheating has occurred, the irreversible discoloration ink was applied to the second variable part. However, since the irreversible discoloration ink is applied to the separate second variable part, it may not be used in an injection or extrusion process, and thus, there is a problem in that an additional printing process and other processes need to be introduced, leading to an increase in process costs and price. Further, the irreversible discoloration ink has a color change temperature of 90° C. or higher. In the case of PVC, which is a main material of wires, even though it is continuously overheated at a temperature of 70° C. to 90° C., which is a temperature at which PVC deteriorates, the temperature does not reach the color-change temperature. Therefore, there is a problem in that it is impossible to detect an overheated portion even though overheating has occurred. In addition, since the discoloration ink itself is susceptible to heat which is applied during the injection or extrusion process, there is a process problem in that a separate ink printing process is required after processing of the injection and extrusion processes.

Patent Document 3 relates to "an electrically insulated molded article, in which an irreversibly thermochromic material is placed, and a manufacturing method thereof", in which a resin forming the electrically insulated molded article is molded into a desired shape, and then the irreversibly thermochromic material such as an irreversible discoloration ink is adhered, printed, or applied on the surface of the electrically insulated molded article after molding. In other words, in order to solve the problem whereby, when the irreversibly thermochromic material is included in the molded article and then molded at a high temperature, it may not be used again due to discoloration caused by the temperature rise, the irreversibly thermochromic material is separately placed in the molded article of which molding is completed. Therefore, this patent also has the problem that the irreversibly thermochromic material, such as the irreversible discoloration ink, etc., may not be used in an injection or extrusion process, as in Patent Document 2.

(Patent Document 1) Korean Patent No. 0855387
(Patent Document 2) Korean Patent No. 1222138
(Patent Document 3) Japanese Unexamined Patent Application Publication No. 2006-012470

DESCRIPTION OF EMBODIMENTS

Technical Problem

An aspect provides an irreversibly discoloring pigment which becomes discolored when overheated and maintains the discoloration even after being cooled to room temperature.

Another aspect provides an irreversibly thermochromic molded article including the discoloring pigment, which becomes discolored when overheated and maintains the discoloration even after being cooled to room temperature.

Still another aspect provides a method of preparing the irreversibly discoloring pigment, which becomes discolored when overheated and maintains the discoloration even after being cooled to room temperature.

Still another aspect provides a method of manufacturing the irreversible thermochromic molded article, which becomes discolored when overheated and maintains the discoloration even after being cooled to room temperature.

Solution to Problem

An aspect provides an irreversibly discoloring pigment which becomes discolored when overheated and maintains the discoloration even after being cooled to room temperature, the discoloring pigment being in the form of a microcapsule which is composed of a capsule inner layer formed by emulsifying a discoloring pigment mixture including a wax, a leuco dye, and a color developer in an emulsifier; and a capsule outer layer formed by curing a thermosetting resin on the outer side of the capsule inner layer.

Another aspect provides a method of preparing the discoloring pigment, the method including preparing the emulsifier using a water-soluble polymeric material as the emulsifier;

preparing the discoloring pigment mixture by melting the wax and then mixing the wax with the leuco dye and the color developer;

forming the capsule inner layer by introducing the discoloring pigment mixture into the emulsifier and then emulsifying the discoloring pigment mixture;

forming the capsule outer layer by adding the thermosetting resin to the capsule inner layer and heating them while stirring;

curing the capsule outer layer by maintaining the reaction while stirring at 70° C. or higher for 4 hours or more; and preparing the discoloring pigment by slowly cooling the capsule to room temperature and aging the capsule without agglomeration.

Still another aspect provides an irreversible thermochromic molded article which becomes discolored when overheated and maintains the discoloration even after being cooled to room temperature, the thermochromic molded article manufactured by injecting or extruding a mixture including the discoloring pigment and a resin.

Still another aspect provides a method of manufacturing the irreversible thermochromic molded article which becomes discolored when overheated and maintains the discoloration even after being cooled to room temperature, the method including preparing the emulsifier using a water-soluble polymeric material as the emulsifier;

preparing the discoloring pigment mixture by melting the wax and then mixing the wax with the leuco dye and the color developer;

forming the capsule inner layer by introducing the discoloring pigment mixture into the emulsifier and then emulsifying the discoloring pigment mixture;

forming the capsule outer layer by adding the thermosetting resin to the capsule inner layer and heating them while stirring;

curing the capsule outer layer by maintaining the reaction while stirring at 70° C. or higher for 4 hours or more;

preparing the discoloring pigment by slowly cooling the capsule to room temperature and aging the capsule without agglomeration; and injecting or extruding a mixture of the discoloring pigment and the resin.

Advantageous Effects of Disclosure

A discoloring pigment according to a specific embodiment of the present disclosure becomes discolored when overheated, which is irreversible at room temperature, and therefore, the discoloring pigment may be applied to products to identify an overheated part even after being cooled to room temperature after overheating.

Further, according to a specific embodiment, since the irreversibly discoloring pigment prepared by using a thermosetting resin has heat resistance at a temperature of 250° C. to 300° C., it is advantageous in that a variety of molded articles may be manufactured in a simple manner such as extrusion or injection.

Further, according to a specific embodiment, there is also an advantage that the discoloring pigment which may be discolored at a temperature lower than a deterioration temperature of PVC mainly used in wires may be adopted and widely applied to a variety of overheat detection products such as an insulated protective tab, a compression terminal inspection tab, etc.

MODE OF DISCLOSURE

Figure 1:
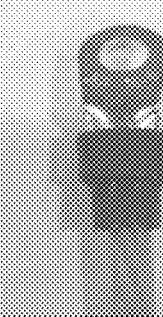
FIG. 1 shows photographs of insulated protective caps at room temperature, in an overheated state, and in a re-cooled state, in which the insulated protective caps are insulated protective caps of Examples 4A (yellow), 4B (red), and 4C (blue) manufactured according to one specific embodiment of the present disclosure and a commercially available insulated protective cap.

Hereinafter, the present disclosure will be described in more detail.

Unless defined otherwise, all technical terms used herein have the same meanings as those generally understood by one of ordinary skill in the art to which the present disclosure belongs. Further, although methods or samples are described herein, those similar or equivalent thereto are also incorporated in the scope of the present disclosure. The disclosures of all articles and references are herein incorporated by reference in their entireties.

The term "overheating" refers to a state in which heat is generated at a connection between wires to cause a risk such as a fire, and refers to 70° C. or more.

The term "deterioration" refers to a permanent reduction in physical properties of a material.

The term "room temperature" means a normal temperature, specifically, a range of 20° C.±5° C.

The present inventors have studied to develop an overheat detection product which becomes discolored when overheated, but maintains the discoloration even when cooled to room temperature so that overheating may be detected not only at the time of overheating but also after being cooled to room temperature, thereby enabling repair or replacement. The present inventors also have studied to develop an overheat detection product which may be simply manufactured by a process of injection or extrusion, in which a discoloring pigment is able to withstand a high temperature of 250° C. to 300° C.

As a result, they developed a discoloring pigment in the form of a microcapsule, which becomes discolored when overheated and maintains the discoloration even after being cooled to room temperature, and also has heat resistance at a high temperature. When the discoloring pigment is used, overheat detectable products, for example, an insulated protective cap, a tubular terminal lug inspection tab, etc., may be simply manufactured by a process of injection or extrusion.

Accordingly, an aspect of the present disclosure provides an irreversibly discoloring pigment which becomes discolored when overheated and maintains the discoloration even after being cooled to room temperature, the discoloring pigment being in the form of a microcapsule which is composed of a capsule inner layer formed by emulsifying a discoloring pigment mixture including a wax, a leuco dye, and a color developer in an emulsifier; and a capsule outer layer formed by curing a thermosetting resin on the outer side of the capsule inner layer.

Hereinafter, the irreversibly discoloring pigment which becomes discolored when overheated and maintains the discoloration even after being cooled to room temperature is also referred to as "thermochromic irreversibly discoloring pigment" or "irreversibly thermochromic pigment".

The term "thermochromic" means that a color changes with temperature.

Since discoloring pigments commonly used in existing overheat detection products, such as insulated protective caps, etc., are reversible discoloring pigments that are discolored at 70° C. or higher and return to their original color at 60° C. or lower, there is a problem that overheated products may not be detected after cooling to room temperature. However, when the irreversibly discoloring pigment according to an aspect of the present disclosure, which becomes discolored when overheated and maintains the discoloration even after being cooled to room temperature, is used, whether or not it has been overheated may be identified even after being cooled to room temperature, once it was overheated, and accordingly, it enables replacement of the overheat detection product and repair of the overheated part.

In a specific embodiment, the discoloring pigment has a form of microcapsule including the wax, the leuco dye, and the color developer in its inner layer.

The discoloring pigment in the form of a microcapsule is a pigment having a characteristic of undergoing discoloration by a temperature change through a phenomenon that a color disappears (becomes transparent) and then appears again through the action of melting and hardening by a phase change of the wax in the inner layer of the microcapsule. The phase change of the wax occurs inside the microencapsulated discoloring pigment. The microencapsulated discoloring pigment has a reversible discoloration property, in which when the temperature rises above the melting point of the wax, the inside of the microcapsule is melted and the color disappears, and on the contrary, when the temperature falls below the freezing point, the microcapsule is solidified and the color reappears. This is attributed to a phenomenon that the colorless leuco dye having a property of donating electrons and the color developer as an electron acceptor stop working when the wax is melted, or they work again by solidification of the wax.

In other words, the discoloring pigments show the different discoloration temperatures depending on the phase change temperature of the wax included therein, and the discoloration temperatures of various waxes are shown in Table 1 below.

TABLE 1

| | | Temperature of discoloring pigment (° C.) | |
|---|---|---|---|
| Name of wax | Melting point (° C.) | Decoloration temperature | Coloration temperature |
| Dodecanol | 24.0 | 20.0→26.0 | 22.0→16.0 |
| 1-Tetradecanol | 38.0 | 30.0→40.0 | 36.0→28.0 |
| Cetyl alcohol | 49.3 | 44.0→52.0 | 47.0→38.0 |
| Stearyl alcohol | 59.4~59.8 | 54.0→61.0 | 57.0→48.0 |
| Arachidyl alcohol | 64.0 | 60.0→66.0 | 62.0→54.0 |
| Behenyl Alcohol | 70.0 | 66.0→71.0 | 67.0→60.0 |

The discoloring pigments adopted by the existing overheat detection products, such as insulated protective caps, etc., have a reversible property, in which the pigments are decolored by overheating, and then, the color reappears by solidification of the wax around 10° C. of the melting point, as in the waxes of Table 1. Thus, it is impossible to identify whether or not overheating has occurred when cooled to room temperature, because the coloration temperature is above room temperature. On the contrary, when the wax inside the microcapsule melts and decolors by overheating, and then the wax is solidified at a significantly lower temperature, rather than around 10° C. of the melting point, i.e., below room temperature, the wax does not return to its original color even when cooled to room temperature. That is, due to the irreversible property, whether or not overheating has occurred may be identified based on decoloration.

An example of such a discoloring pigment in the form of a microcapsule, which is irreversible at room temperature while having the thermochromic property, is disclosed in Japanese Patent Laid-Open No. Hei 8-39936. The discoloration temperatures of the waxes which are applicable to the discoloring pigment in the form of a microcapsule described herein are shown in Table 2 below.

TABLE 2

| | Discoloration temperature (° C.) | |
|---|---|---|
| Name of wax | Decoloration temperature | Coloration temperature |
| n-Hexanophenone | 15.0→26.0 | 8.0→4.0 |
| n-Octanophenone | 13.0→22.0 | 1.0→−1.0 |
| n-Nonophenone | 8.0→13.0 | 3.0→0.0 |
| n-Decanophenone | 27.0→36.0 | 16.0→14.0 |
| n-Laurophenone | 38.0→44.0 | 34.0→28.0 |
| n-Tetradecanophenone | 46.0→53.0 | 40.0→37.0 |
| n-Hexadecanopheneone | 52.0→59.0 | 50.0→45.0 |
| n-Heptadecanophenone | 53.0→58.0 | 50.0→46.0 |
| n-Octadecanophenone | 60.0→67.0 | 59.0→54.0 |
| 4'-n-Octylactophenone | 3.0→15.0 | −23.0→−27.0 |
| 2-Acetonaphtone | −2.0→40.0 | −8.0→−15.0 | n-Decanophenone in Table 1 exhibits a property of being discolored (decolored) at room temperature or higher, and then developing its color again at a temperature lower than room temperature, that is, a property of irreversible discoloration at room temperature. Therefore, n-decanophenone may be used as the wax of the discoloring pigment in the form of a microcapsule according to a specific embodiment of the present disclosure. In a specific embodiment, the thermochromic irreversible wax which becomes discolored (decolored) at room temperature or higher, and then develops its color at a temperature lower than room temperature, but does not develop its color at room temperature may be, for example, selected from the group consisting of 2-(4-phenylmethoxyphenyl)ethyl decanoate), dodecanophenone, naphtyl laurate, and any combination thereof. Due to use of these waxes, the discoloring pigment in the form of a microcapsule may form a discoloring pigment that does not return to its original color at room temperature (20° C.±5° C.) after being discolored when overheated, that is, exhibits an irreversible behavior at room temperature due to its very low coloration temperature. These thermochromic irreversibly discoloring pigments may be used to manufacture an overheating-detecting insulated protective cap, thereby identifying a point where overheating occurred at any time even after cooling to room temperature.

In a specific embodiment, the wax may be a wax having a decoloration temperature lower than a deterioration temperature (about 80° C.) of PVC. A thermochromic discoloring pigment prepared by adopting the wax may be discolored before deterioration of PVC, when overheated. Therefore, there is an advantage that when wires manufactured by using mainly PVC are overheated, an overheat detection product including the thermochromic discoloring pigment detects overheating before deformation due to deterioration, thereby enabling replacement of the overheated product.

The leuco dye may be any dye known to be prepared as the thermochromic discoloring pigment in the art, and the leuco dye may be, for example, selected from the group consisting of 2-anilino-6-dibutylamino-3-methylfluoran, 3,3-bis(4-dimethyl-aminophenyl)-6-demethylaminophtalide, 3-(4-diethylamino-2-ethoxyphenyl)-3-(1-ethyl-2-methylindol-3-yl)-4-azaphthalide, 6'-(diethylamino)-1',2'-benzofluoran, 3,3-bis(1-n-butyl-2-methylindol-3-yl) phthalide, 1,3-dimethyl-6-diethylaminofluoran, 2-N,N-dibenzylamino-6-diethylaminofluran, N,N-dimethyl-4-[2-[2-(octyloxy)phenyl]-6-phenyl-4-pyridinyl]-bezenamine, and any combination thereof, but is not limited thereto.

The color developer may be any color developer known to be prepared as the thermochromic discoloring pigment in the art, and the color developer may be, for example, selected from the group consisting of bisphenol A, 4-hydroxy-4'-isopropoxy-diphenyl sulfone, bis-(3-allyl-4-hydroxyphenyl)-sulfone, and any combination thereof, but is not limited thereto.

In the discoloring pigment, 5 parts by weight to 15 parts by weight of the leuco dye, and 10 parts by weight to 30 parts by weight of the color developer may be used with respect to 100 parts by weight of the wax.

First, the discoloring pigment mixture may be prepared by dissolving the wax, the leuco dye, and the color developer together, in which the mixture may be prepared by melting the wax by increasing a temperature above the melting point of the wax, specifically, above about 100° C.

The emulsified form of the mixture of the wax, the leuco dye, and the color developer included in the capsule inner layer may be prepared by mixing and emulsifying the mixture with the emulsifier. The emulsifier may be any emulsifier known to be used in the preparation of the discoloring pigment in the form of a microcapsule.

In a specific embodiment, a water-soluble polymeric material may be used as the emulsifier. More specifically, a water-soluble polymeric material which is an anionic surfactant may be used. For example, the water-soluble polymeric material which is an anionic surfactant may be a polystyrene sulfonic acid-based material or a styrene maleic anhydride (SMA)-based material. When those having a molecular weight of less than 30 are used, an appropriate viscosity may be maintained, and a stable emulsifying capacity may be maintained during encapsulation. The emulsifier may be used in the range of 0.5 parts by weight to 50 parts by weight with respect to 100 parts by weight of the wax.

The microcapsule outer layer may be prepared by using a thermosetting resin, thereby ensuring heat resistance and solvent resistance of the discoloring pigment. As a result, a variety of molded articles may be manufactured by injection or extrusion using the resin. If the microcapsule outer layer is prepared by using a thermoplastic resin, severe deformation by heat may occur and solvent resistance against a solvent may become weak. For this reason, the outer layer may be prepared by using the thermosetting resin.

The thermosetting resin may be any thermosetting resin known in the art, and the thermosetting resin may be, for example, selected from the group consisting of melamine, urea, phenol, benzoguanamine, acetoguanamine, urethane, epoxy, poly(methyl methacrylate) (PMMA), polystyrene (PS), and any combination thereof, but is not limited thereto.

The microcapsule outer layer may be used in an amount of 10 parts by weight to 70 parts by weight, more specifically, 30 parts by weight to 50 parts by weight with respect to 100 parts by weight of the wax. When the content of the outer layer is too high, the color of the discoloring pigment may be blurred, and agglomeration of the microcapsule may occur in the initial polymerization. When the content of the outer layer is too low, there is a problem in that heat resistance and solvent resistance of the microcapsule may be deteriorated.

The discoloring pigment of the microcapsule form may be used after being powdered, before adding the discoloring pigment to the resin to be used in manufacturing a molded article. When the discoloring pigment is added during injection and extrusion for manufacturing a molded article, the discoloring pigment including water may not be used, and therefore, the microcapsule may be used after being powdered by completely removing water. For the powdering, any method acceptable in the art may be used. For example, the microcapsule may be used by pulverizing to an appropriate size, after removing water therefrom using a spray drying method, an oven drying method, etc.

In a specific embodiment, the thermochromic irreversibly discoloring pigment may be prepared by a method including:

preparing the emulsifier using a water-soluble polymeric material as the emulsifier;

preparing the discoloring pigment mixture by melting the wax and then mixing the wax with the leuco dye and the color developer;

forming the capsule inner layer by mixing and emulsifying the emulsifier and the discoloring pigment mixture;

forming the capsule outer layer by adding the thermosetting resin to the capsule inner layer and heating them while stirring;

curing the capsule outer layer by maintaining the reaction while stirring at 70° C. or higher for 4 hours or more; and preparing the discoloring pigment by slowly cooling the capsule to room temperature and aging the capsule without agglomeration.

The curing may further include mixing by adding a diluted aqueous organic acid solution of 5% by weight to 10% by weight. The outer layer of the capsule may be further hardened by the treatment of the aqueous organic acid solution. The organic acid may be any organic acid that is able to harden the outer layer of the capsule, and the organic acid may be, for example, selected from the group consisting of citric acid, acetic acid, tartaric acid, and any combination thereof, but is not limited thereto.

Another aspect of the present disclosure provides a method of preparing the discoloring pigment according to one aspect of the present disclosure, the method including preparing the emulsifier using the water-soluble polymeric material as the emulsifier;

preparing the discoloring pigment mixture by melting the wax and then mixing the wax with the leuco dye and the color developer;

forming the capsule inner layer by introducing the discoloring pigment mixture into the emulsifier and then emulsifying the discoloring pigment mixture;

forming the capsule outer layer by adding the thermosetting resin to the capsule inner layer and heating them while stirring;

curing the capsule outer layer by maintaining the reaction while stirring at 70° C. or higher for 4 hours or more; and preparing the discoloring pigment by slowly cooling the capsule to room temperature and aging the capsule without agglomeration.

The description of the discoloring pigment according to one aspect of the present disclosure may be applied as it is to a detailed description of the preparation method.

Still another aspect of the present disclosure provides an irreversible thermochromic molded article which becomes discolored when overheated and maintains the discoloration even after being cooled to room temperature, the thermochromic molded article manufactured by injecting or extruding a mixture including the discoloring pigment according to one aspect of the present disclosure and a resin.

The thermochromic irreversibly discoloring pigment may be mixed with the resin for manufacturing a molded article in a predetermined ratio, and then the molded article may be manufactured according to any method of manufacturing molded articles.

In a specific embodiment, the method of manufacturing the molded article may be a method by injection or extrusion. In the case of injection, a mold of a desired shape is manufactured and then injected. The extrusion may be performed by a common method of manufacturing a desired molded article by maintaining the temperature above a deformation temperature of a resin to be used, and adjusting an appropriate pressure. In this regard, the thermochromic irreversibly discoloring pigment may be used by mixing 0.1 part by weight to 15 parts by weight thereof with respect to 100 parts by weight of the resin. More specifically, when the thermochromic irreversibly discoloring pigment may be used by mixing 1 part by weight to 5 parts by weight thereof, appropriate concentration and color may be obtained. When the content of the discoloring pigment is too high, there is a problem in that deformation of the molded article may occur during injection or extrusion or the discoloring pigment may not be uniformly dispersed in the resin.

The molded article may be an insulated protective cap, a tubular terminal lug inspection tab, a washer inspection tab, or any overheatable product. Therefore, the irreversible thermochromic molded article which becomes discolored when overheated and maintains the discoloration even after being cooled to room temperature may be an overheat detection product.

Still another aspect provides a method of manufacturing the irreversible thermochromic molded article which becomes discolored when overheated and maintains the discoloration even after being cooled to room temperature, the method including:

preparing the emulsifier using the water-soluble polymeric material as the emulsifier;

preparing the discoloring pigment mixture by melting the wax and then mixing the wax with the leuco dye and the color developer;

forming the capsule inner layer by introducing the discoloring pigment mixture into the emulsifier and then emulsifying the discoloring pigment mixture;

forming the capsule outer layer by adding the thermosetting resin to the capsule inner layer and heating them while stirring;

curing the capsule outer layer by maintaining the reaction while stirring at 70° C. or higher for 4 hours or more;

preparing the discoloring pigment by slowly cooling the capsule to room temperature and aging the capsule without agglomeration; and injecting or extruding a mixture of the discoloring pigment and the resin.

The descriptions of the discoloring pigment according to one aspect of the present disclosure and the thermochromic molded article may be applied as it is to a detailed description of the manufacturing method.

Hereinafter, the present disclosure will be described in detail with reference to the following Examples. However, the following Examples are only for illustrating the present disclosure, and the scope of the present disclosure is not limited thereto.

Example 1: Preparation of Water-Soluble Polymeric Material as Emulsion

About 4% by weight of styrene maleic anhydride was added to water, and dissolved therein while stirring for about 10 hours while slowly raising the temperature to 85° C. to 90° C. After preparation, the solution was filtered using a GF/A filter (Whatman) at about 40° C., and then the resultant was used as an emulsion.

Example 2A: Preparation of Discoloring Pigment (Blue) that is Irreversibly Discolored at Room Temperature 500 g of 2-(4-phenylmethoxyphenyl)ethyl decanoate was mixed with 25 g of Blue-63 (Yamamoto chemicals, INC) and 50 g of Bisphenol A, and then dissolved while raising the temperature to 120° C. The resultant was introduced into 1000 g of the water-soluble polymeric emulsion prepared in Example 1, and emulsified at about 60° C. to about 70° C. and 6,000 rpm for 5 minutes. Then, 500 g of 40% by weight of a melamine condensate was introduced and allowed to react at 85° C. for 4 hours. Thereafter, to make the capsule harder, 65 g of 5% by weight of citric acid was added and allowed to react for 4 hours, and then slowly cooled while stirring at room temperature, thereby preparing a discoloring pigment.

Example 2B: Preparation of Discoloring Pigment (Red) that is Irreversibly Discolored at Room Temperature 500 g of 2-(4-phenylmethoxyphenyl)ethyl decanoate was mixed with 25 g of Red-8 (Yamamoto chemicals, INC) and 50 g of Bisphenol A, and then dissolved while raising the temperature to 120° C. The resultant was introduced into 1000 g of the water-soluble polymeric emulsion prepared in Example 1, and emulsified at about 60° C. to about 70° C. and 6,000 rpm for 5 minutes. Then, 500 g of 40% by weight of a melamine condensate was introduced and allowed to react at 85° C. for 4 hours. Thereafter, to make the capsule harder, 65 g of 5% by weight of citric acid was added and allowed to react for 4 hours, and then slowly cooled while stirring at room temperature, thereby preparing a discoloring pigment.

Example 2C: Preparation of Discoloring Pigment (Yellow) that is Irreversibly Discolored at Room Temperature 500 g of 2-(4-phenylmethoxyphenyl)ethyl decanoate was mixed with 25 g of N,N-Dimethyl-4-[2-(2-octoxy)phenyl-6-phenylpyridin-4-yl]aniline and 50 g of Bisphenol A, and then dissolved while raising the temperature to 120° C. The resultant was introduced into 1000 g of the water-soluble polymeric emulsion prepared in Example 1, and emulsified at about 60° C. to about 70° C. and 6,000 rpm for 5 minutes. Then, 500 g of 40% by weight of a melamine condensate was introduced and allowed to react at 85° C. for 4 hours. Thereafter, to make the capsule harder, 65 g of 5% by weight of citric acid was added and allowed to react for 4 hours, and then slowly cooled while stirring at room temperature, thereby preparing a discoloring pigment.

Examples 3A to 3C: Powdering of Discoloring Pigments

Each of the discoloring pigments prepared in Examples 2A (blue), 2B (red), and 2C (yellow) was centrifuged using a centrifuge at 4000 rpm for 20 minutes, and then only a lower layer was taken. This method was repeated about 10 times, and only the remaining lower layer liquid was filtered using a 1 μm filter. Then, only the discoloring pigment which was not filtered was taken and dried in an oven at 70° C. for 24 hours or more. Thereafter, the discoloring pigment was finely pulverized and passed through a 200 mesh, thereby being used as a discoloring pigment powder.

Examples 4A to 4C: Manufacture of Overheating-Detecting Insulated Protective Cap (Injection)

30 g of the powder prepared in Examples 3A (blue), 3B (red), or 3C (yellow) was mixed well with 1000 g of PVC (GE90A, Young Polymer Co., Ltd.) resin, and this mixture was introduced into a mold of an insulated protective cap to manufacture an insulated protective cap according to a common injection method. Then, for color development, color was developed at −20° C. for about 24 hours to manufacture an overheating-detecting insulated protective cap.

Examples 5A to 5C: Manufacture of Overheating-Detecting Insulated Protective Cap (Extrusion)

30 g of the powder prepared in Example 3 was mixed well with 1000 g of PVC (GE90A, Young Polymer Co., Ltd.) resin, and this mixture was introduced into an insulated protective cap extruder to manufacture an insulated protective cap according to a common extrusion method. Then, for color development, color was developed at −20° C. for about 24 hours to manufacture an overheating-detecting insulated protective cap.

Examples 6A to 6C: Manufacture of Overheating-Detecting Tubular Terminal Lug Inspection Tab (Injection)

30 g of the powder prepared in Examples 3A (blue), 3B (red), or 3C (yellow) was mixed well with 1000 g of PVC (GE90A, Young Polymer Co., Ltd.) resin, and this mixture was introduced into a mold of a tubular terminal lug inspection tab to manufacture a tubular terminal lug inspection tab according to a common injection method. Then, for color development, color was developed at −20° C. for about 24 hours to manufacture an overheating-detecting tubular terminal lug inspection tab.

Experimental Example 1: Observation of Color Change of Overheating-Detecting Insulated Protective Cap and Tubular Terminal Lug Inspection Tab According to Temperature The overheating-detecting insulated protective caps manufactured in Examples 4A to 4C and the overheating-detecting tubular terminal lug inspection tabs manufactured in Examples 6A to 6C were connected with a wire, respectively and put in water at a temperature of 20° C. Then, each of them was taken out, and their colors were examined.

Thereafter, color changes were examined while raising the temperature from 20° C. to 80° C. for about 30 minutes to 60 minutes, and slowly cooling to room temperature (20° C.). Colors of an existing insulated protective cap product (Seoul dipping, model: OSTC-6) and an existing tubular terminal lug inspection tab product (manufacturer: Eyecapkorea, standard: 35-2H-45) were also examined with the unaided eye while raising the temperature to 80° C., and then cooling to room temperature (20° C.) in the same manner as above.

FIG. 1 shows photographs of the insulated protective caps at room temperature (20° C.), in an overheated state (80° C.), and in a re-cooled state.

Figure 2:
FIG. 2 shows photographs of tubular terminal lug inspection tabs at room temperature (20° C.), in an overheated state (80° C.), and in a re-cooled state, in which the insulated protective caps are tubular terminal lug inspection tabs of Examples 6A (yellow), 6B (red), and 6C (blue) manufactured according to one specific embodiment of the present disclosure and a commercially available tubular terminal lug inspection tab.

FIG. 2 shows photographs of the tubular terminal lug inspection tabs at room temperature (20° C.), in an overheated state (80° C.), and in a re-cooled state.

Further, the temperatures at which color changes of the insulated protective caps were observed, i.e., decoloration temperature and coloration temperature were examined and shown in Table 3 below.

TABLE 3

| | Temperature of discoloring pigment (° C.) | |
| --- | --- | --- |
| Color | Decoloration temperature | Coloration temperature |
| Examples 4A and 6A (Yellow) | 50.0→65.0 | 5.0→−10.0 |
| Examples 4B and 6B (Red) | 50.0→65.0 | 5.0→−10.0 |
| Examples 4C and 6C (Blue) | 50.0→65.0 | 5.0→−10.0 |
| Existing product (insulated protective cap) | 60.0→66.0 | 60.0→55.0 |
| Existing product (tubular terminal lug inspection tab) | 61.0→67.0 | 60.0→53.0 |

According to the results of Table 3 and FIGS. 1 and 2, the existing commercially available insulated protective cap product started to discolor at 60° C. or higher, and completed the discoloration at 66° C. When re-cooled, it developed the color at 60° C. and restored its original color at 55° C. The existing commercially available tubular terminal lug inspection tab product started to discolor at 61° C. or higher, and completed the discoloration at 67° C. When re-cooled, it developed the color at 60° C. and completely restored its original color at 53° C. In contrast, the insulated protective caps of Examples 4A to 4C and the tubular terminal lug inspection tabs of Examples 6A to 6C completed the discoloration at 65° C. or higher. Even though the temperature was decreased to room temperature (20° C.), they did not restore their original colors, and their colors slowly started to appear at 5° C. The colors were completely restored at 0° C. or lower, or −10° C. Therefore, it was confirmed that once the insulated protective caps and tubular terminal lug inspection tabs according to the present disclosure were overheated at 65° C. or higher, their overheated states may be identified with the unaided eye, as long as they were not re-cooled to 5° C. or lower. Accordingly, the overheated states of the insulated protective caps and tubular terminal lug inspection tabs according to the present disclosure may be identified with the unaided eye, unless the room temperature is lowered below 5° C., and they may be applied throughout the four seasons.

Hereinabove, the present disclosure has been described with reference to exemplary embodiments thereof. It will be understood by those skilled in the art to which the present disclosure pertains that the present disclosure may be implemented in modified forms without departing from the essential features of the present disclosure. Therefore, exemplary embodiments disclosed herein should be considered in an illustrative aspect rather than a restrictive aspect. The scope of the present disclosure should be defined by the claims rather than the above-mentioned description, and it shall be interpreted that all differences within the equivalent scope are included in the present disclosure.

The invention claimed is:

1. A method of manufacturing an irreversible thermochromic molded article which becomes discolored when overheated but maintains the discoloration even after being cooled to room temperature, the method comprising:
   preparing an emulsifier using a water-soluble polymeric material as an emulsifier;
   preparing a discoloring pigment mixture by melting a wax and then mixing the wax with a leuco dye and a color developer;
   forming a capsule inner layer by introducing the discoloring pigment mixture into the emulsifier and then emulsifying the discoloring pigment mixture;
   forming a capsule outer layer by adding a thermosetting resin to the capsule inner layer and heating them while stirring thereby forming a capsule;
   curing the capsule outer layer by maintaining the reaction under stirring at 70° C. or higher for 4 hours or more;
   preparing the discoloring pigment by slowly cooling the capsule to room temperature and aging the capsule without agglomeration; and
   injecting or extruding a mixture of the discoloring pigment and a resin.

2. The method of claim 1, wherein the irreversible thermochromic molded article is an insulated protective cap or a tubular terminal lug inspection tab.

\* \* \* \* \*